May 25, 1948.     R. C. BALLARD     2,442,069
SYNCHRO UNIT DRIVE SYSTEM
Filed Dec. 7, 1946
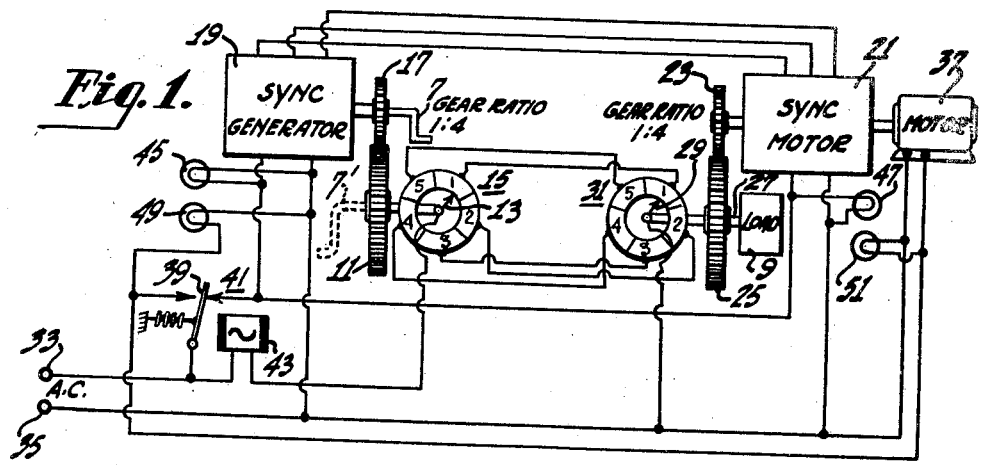
Inventor
Randall C. Ballard
Attorney Patented May 25, 1948

2,442,069

UNITED STATES PATENT OFFICE 2,442,069

SYNCHRO UNIT DRIVE SYSTEM

Randall C. Ballard, Trenton, N. J., assignor to Radio Corporation of America, a corporation of Delaware Application December 7, 1946, Serial No. 714,885

6 Claims. (Cl. 318—24)

This invention relates to follow-up systems of the type in which the angular position of an input shaft controls an output shaft to maintain a predetermined positional relation by means of a synchro-generator and a synchro-motor, and more particularly to follow-up systems in which increased sensitivity is achieved by connecting a step-down gear between the synchro-motor and the output shaft.

It is well known that when the field windings of a synchro-generator and a synchro-motor are connected together and their rotor windings energized by a source of alternating current that the synchro-generator converts the angular position of its shaft into a set of electrical voltages which when applied to the field windings of the synchro-motor cause the rotor of the latter device to assume a similar angular position, and that any variation of the generator shaft will then be reproduced by the shaft of the synchro-motor. Such devices are commonly used to reproduce angular movement at a distance, the drive shaft of the synchro-motor being connected directly or indirectly to a load device which may be an indicator dial, an antenna or any other device whose angular position is to be controlled from a distance.

It is also well known that a small deviation of the control shaft of the synchro-generator produces only a small torque in the synchro-motor. In order to increase the sensitivity of the system it has heretofore been proposed to employ two synchro-generators and two synchro-motors, one pair for "coarse" adjustment operating in a 1:1 gearing ratio with respect to the controlling or input shaft and the controlled or output shaft respectively, the other pair for "fine" adjustment being geared to the input and output shafts so that for a small angular displacement of the input shaft a relatively large displacement of one of the synchro-generators is produced. This in turn produces a relatively large torque in the connected synchro-motor, the resulting movement being transmitted to the load device through the gear mechanism. A device of this type is described in U. S. Patent No. 2,407,876, issued September 17, 1946.

The reason that two pairs of synchro devices are required is that there are a number of positions of ambiguity in synchro devices which are connected to the input or output shafts by coupling gears. That is, assuming a gear ratio of 10:1, rotating the input shaft through an angular rotation of 36° will cause the synchro-generator to rotate 360°. The synchro-motor will normally follow the generator through the same angular rotation, but it will be noted that the system would also be balanced, that is, the rotors of the synchro-generator and synchro-motor would again be in the same relative positions, if the synchro-motor did not rotate at all or if it were caused to rotate two or more full revolutions instead of one. While the output of the system would follow the input correctly if the input shaft were moved sufficiently slowly to allow the output shaft to maintain its relative position, power interruptions or excessive drag by the load might cause the output device to assume one of the displaced positions of ambiguity corresponding to a synchro-motor rotation of one or more full turns. In accordance with the prior art this ambiguity has been overcome by a second or direct-coupled pair of synchro devices, these serving to maintain the relative angular deviation of the input and output shafts within the approximate range necessary to insure that the synchro-motor is within 360° of the correct angular position. The fine or exact control is then effected by the first pair of synchro devices.

The aforementioned system has the disadvantage that four synchro devices are required. These are frequently bulky, particularly when substantial power is to be delivered to the load device, involved considerable cost and increase the complexity of the apparatus. It is therefore the primary object of this invention to provide a geared follow-up system characterized by high accuracy, but which does not require four synchro devices, and which operates without ambiguity with one synchro-generator and one synchro-motor.

A further object of this invention is to provide a follow-up system of increased sensitivity. A still further object of this invention is to provide a follow-up system employing a geared synchro-motor which includes means for automatically correcting the positional ambiguity which would otherwise result.

A still further object of this invention is to provide a follow-up system of increased sensitivity in which positional ambiguity is automatically corrected by a simple control circuit which is automatic in operation, and which brings the output device into approximate positional agreement with the input device so that the follow-up system can control without ambiguity the final position of the output device to minimize the angular deviation.

The novel features that are considered characteristic of this invention are set forth with particularity in the appended claims. The invention both as to its organization and method of operation, as well as additional objects and advantages thereof, will best be understood from the following description when read in connection with the accompanying drawings, in which Figure 1 is a circuit diagram of a follow-up system in accordance with this invention, and Figure 2 is a circuit diagram of an alternative embodiment of this invention.

Referring to Fig. 1, an input shaft 7, which may be manually operated to control the angular position of a load device 9, is connected to the rotor of a synchro-generator 19 and a spur gear 17 of relatively small diameter. Gear 17 meshes with and drives a second gear 11 of relatively large diameter and also drives the contact arm 13 of a commutator 15. The field windings of the synchro-generator 19 are connected to the field windings of a cooperating synchro-motor 21, the rotor of which drives a gear 23 of the same diameter as gear 17, which meshes with and drives a larger gear 25 to which is connected the output shaft 27, the load 9, and the rotatable contact arm 29 of a second commutator 31. The relative diameter of the gears 11 and 25 with respect to their cooperating gears 17 and 23 are selected to give the desired coupling ratio which in the present instance is assumed to be 4:1.

A source of 60 cycle alternating current is not available at terminals 33 and 35. The common terminal 35 is connected to the rotor windings of the synchro-generator 19 and the synchro-motor 21 as well as to one terminal of a small auxiliary motor 37 and the rotor arm 29 of commutator 31. The remaining terminal 33 of the alternating current source is connected to the movable contact 39 of an alternating current relay 41 and to one terminal of the solenoid 43 of the relay. The other terminal of solenoid 43 is connected to the movable contact arm 13 of commutator 15. Relay 41 is provided with two contact terminals between which contact arm 39 moves. The terminal which engages contact arm 39 when the solenoid is actuated is connected to the remaining terminals of the rotors of synchro-generator 19 and synchro-motor 21. The other contact which is engaged by contact arm 39 when relay 41 is deenergized is connected to the remaining terminal of motor 37.

Commutators 15 and 31 each comprise a plurality of segments, the number preferably being one more than the gear ratio employed. In the case illustrated, since the gear ratio is 1:4, five commutator segments numbered 1 to 5 respectively would be employed. The commutator segments of the first commutator are connected to the correspondingly numbered segments of the second commutator. The two contact arms 13 and 29 are initially adjusted so that when the system is in balance, that is, when the input shaft and the output shaft are in correct positional agreement, the two contact arms engage any two similarly numbered and connected segments of the two commutators.

It will be observed that as a result of the connections illustrated and the adjustment described above, that when power is applied to terminals 33 and 35 an electrical circuit is completed through the solenoid 43 in series with the two commutators. This causes relay 41 to be actuated to connect the rotor windings of the synchro-generator and synchro-motor across the source of alternating current. When the input shaft 7 is turned, the rotor of the synchro-generator is likewise turned, and a similar rotation of the rotor of the synchro-motor is produced. This rotation is applied to the load through step-down gears 23 and 25 to rotate the output shaft and the load. If the input shaft is moved sufficiently slowly and there are no circuit interruptions, the output shaft will continuously follow all movements of the input shaft, although with reduced amplitude. Consequently the control circuit through the commutator segments will remain closed as the contact arms 13 and 29 engage corresponding commutator segments. If, however, the synchro-generator is rotated so rapidly that the synchro-motor is unable to follow the required movements, and if the movement is continued to such an extent that the synchro-generator gets one or more complete revolutions ahead of the synchro-motor, it will be observed that the contact arm 13 will move to an adjoining commutator segment before contact arm 29 moves to the corresponding segment, and the control circuit will open deactivating relay 41. As a result, the input power is removed from the synchro-generator and the synchro-motor and these devices lose control momentarily. Power is applied, however, to motor 37 which begins to rotate and turns the output shaft and the contact arm 29 until approximate positional agreement has been restored, at which time the control circuit will be reestablished. The relay then operates and the synchro devices assume control and operate as before.

As stated above, there is one more commutator segment than the gear ratio employed. The purpose of this is to insure that the contact arm moves to an adjacent commutator segment before the synchro-generator, or synchro-motor, as the case may be, rotates 360°. If each gear ratio is 1:$n$, the number of segments will be $n+1$. Thus the synchro-generator will rotate $n$ degrees for each degree of rotation of the contact arm of commutator 15, and similarly with respect to the synchro-motor and the output shaft. Consequently, when $n=4$, rotating the input shaft 7 through 360° will cause the rotor of the synchro-generator to rotate 360°, and the contact arm 13 will rotate through 90°. Both contact arms will necessarily pass from one commutator segment to the adjacent segment, since each of the five segments subtend an arc of $$\frac{360}{n+1}$$

or 72°. Motor 37 will take control when the displacement error between the synchro devices exceeds $$\frac{360n}{1+n}, \text{ or } 288°$$

An indicator dial or scale may be connected either to the input shaft 7 or to the shaft of gear 11. In the former case the dial should be capable of indicating more than one complete revolution of the input shaft, and would, for example, indicate the four quadrants and the angular position of the output device within each quadrant. In the latter case the dial would cover 360°, and would indicate directly the position of the load. A combination of the two might also be used, according to the requirements of the particular application.

The contacting surface of the two commutator contact arms should preferably be wider than the insulated portion between the commutator segments. This will prevent the control circuit from functioning as the contact arms pass from one segment to the other.

In order that the operator at one or both terminals of the system may be advised that the system is properly functioning, or that it has reached a point of ambiguity and is being corrected, suitable pilot lights may be employed. That is, a green pilot light 45 may be connected across the terminals of the rotor of synchro-generator 19 and a similar green pilot light 47 connected across the rotor of synchro motor 21. When the power is applied to these devices and the system is operating normally, the operators at both positions are so advised by observing that the green light is lit. A red pilot light 49 is connected between the common A. C. terminal 35 and the lead which applied alternating current to motor 37 for the operator at the input terminal of the device, while a similar red pilot light 51 is connected across the same terminals to provide the same information for the operator at the output terminal of the device. The red pilot lights will operate when power is applied to motor 37, indicating that the system has reached the point of ambiguity and is being corrected.

It is generally desirable not to include a step-up gear between the input shaft and the synchro-generator for the reason that if such were the case the gears would have to be sufficiently rugged to withstand the application of the driving torque. By driving the synchro-generator directly, as described above, the step-up gears 11 and 17 are only required to drive the contact arm of commutator 15, and they may, therefore, be light gears having but little weight. However, as a result of this arrangement there is, in effect, a step-down ratio between the input and output shafts. Thus, in the case illustrated, the input shaft is rotated 4° for each degree of rotation of the output shaft. The benefit derived is that the increased displacement of the synchro-generator and synchro-motor increases the accuracy of the system. If, for example, the two rotors can, for a given load, be brought into positional agreement within 2°, the output shaft will be located within ½° of a predetermined position. Any desired degree of accuracy can thus be achieved by utilizing a suitable gear ratio and calibrating the scale of the input shaft accordingly.

In some cases, it may be necessary to maintain a 1:1 ratio between the input and output shafts. In such a case, the input is applied directly to gear 11, as illustrated by input shaft 7' shown in dotted lines. The step-up gears 11 and 17 will then be suitably designed to transmit the input torque with minimum friction loss, although at some sacrifice in size and weight.

It will also be appreciated that motor 37 may be coupled directly to the output shaft, rather than to the rotor of the synchro motor. Such coupling may be direct, or through suitable gears, depending upon the weight and size of the load which is to be driven.

In the preceding example illustrative of this invention a single gear train has been employed at the controlling end as well as at the controlled end of the system. In case it is desirable to employ a higher gear ratio by using a multiple gear train, a similar system, illustrated in Fig. 2, may be employed.

Referring to Fig. 2, the input shaft 7 is shown coupled to synchro-generator 19 through a multiple gear train comprising gears 11, 53, 55 and 17, each pair having, for example, a step-up ratio of 1:5. It is to be understood, however, that the input shaft may also be connected directly to the synchro generator rotor as in the preceding example, or to an intermediate gear. As before, gear 17 drives the rotor of synchro-generator 19. At the output terminal of the device the load 9 is connected to synchro-motor 21 through a multiple gear drive comprising gears 25, 57, 59 and 23, the last gear being connected to the rotor of the synchro-motor. Each gear train has a ratio of 1:5. The total step-up and step-down gear ratio is therefore 1:25. In this case two coupled commutator systems are required. The first of these includes a six segment commutator 58, the individual segments of which are connected to the corresponding segments of the associated commutator 61. The contact arm of commutator 58 is driven by gear 11 while the contact arm of commutator 61 is driven by the output shaft. A second pair of commutators is also employed. Commutator 63 includes six commutator segments which are connected respectively to the corresponding segments of the associated commutator 65. The contact arm of commutator 63 is driven by the shaft 67 which is common to gears 53 and 55, while the contact arm of commutator 65 is driven by shaft 69 which is common to gears 57 and 59. The four commutators are connected in series with the relay 43 so as to operate the relay when the output shaft is in approximate positional agreement with the input shaft. The operation of the remainder of the system is identical with that described in connection with Fig. 1 above and need not be repeated.

There has thus been described a follow-up control system in which the angular position of an output shaft is controlled by the angular position of an input shaft and which employs a geared follow-up mechanism for increased accuracy which is free from ambiguity and which utilizes less equipment than has heretofore been possible. It is to be understood that the novel system herein described may also be employed in cases where it is not possible to drive the load device directly by the synchro-motor. That is, the output shaft may be used to control the direction of rotation of a driving motor which in turn is connected to the output load. This may be accomplished by conventional methods employing additional synchro-units or by the electrical or mechanical variations of devices controlling the A. C. or D. C. input to a motor control circuit, as is well known in the art.

What I claim is:

1. In a follow-up control system an input shaft, an output shaft, means responsive to the angular movement of said input shaft for moving said output shaft to a related angular position, said shafts being initially within a predetermined positional deviation, and a pair of commutators each having a plurality of segments and a contact arm, one contact arm being coupled for movement with said input shaft and the other contact arm being coupled for corresponding angular movement with said output shaft, a motor for driving said output shaft, a source of electrical power for said motor, and means including said commutators for connecting said motor to said source whereby said motor is energized only when said positional deviation exceeds said predetermined value.

2. In a follow-up control system, an output shaft; a synchro-motor geared to said output shaft by a step-down gear having a 1:$n$ ratio; a synchro-generator, said synchro-generator and synchro-motor being connected together in mutually controlling and controlled relation; and a pair of commutators, each having $n+1$ segments and a contact arm, one contact arm being coupled for movement with said input shaft and the other contact arm for movement with said output shaft, a motor for driving said output shaft, a source of electrical power for said motor, and means including said commutators for connecting said motor to said source in response to a relative displacement of said synchro-motor with respect to said synchro-generator in excess of $$\frac{360n}{n+1} \text{ degrees}$$

3. In a follow-up control system, an input shaft and an output shaft; a synchro motor geared to said output shaft by a step-down gear having a $1:n$ ratio; a synchro-generator coupled to said input shaft; said synchro-generator and synchro-motor being connected in mutually controlling and controlled relation; a pair of commutators each having a plurality of segments and a relatively movable contact arm, one of said commutators being selectively operated by said output shaft, and the other being geared to said synchro-generator by a step-down gear having a $1:n$ ratio; a motor rotating said output shaft, and means including said commutators for energizing said motor only when the angular deviation between said synchro-generator and said synchro-motor exceeds a predetermined value.

4. In a follow-up control system, an input shaft, an output shaft, a synchro-generator coupled to said input shaft and a synchro motor coupled to said output shaft for maintaining a predetermined positional relation between said shafts only when said shafts are initially within a predetermined positional deviation, and a pair of commutators each having a plurality of segments and a contact arm, one contact arm being coupled for movement with said input shaft and the other contact arm being coupled for corresponding angular movement with said output shaft, a motor for driving said output shaft, a source of electrical power for said motor, and means including said commutators for connecting said motor to said source whereby said motor is energized only when said positional deviation exceeds said predetermined value.

5. A follow-up control system comprising an input shaft and an output shaft; a synchro-generator geared to said input shaft so as to rotate $n$ degrees for each degree of rotation of said input shaft; a synchro-motor geared to said output shaft so as to rotate $n$ degrees for each degree of rotation of said output shaft; said synchro-generator and motor being connected in mutually controlling and controlled relation whereby positional agreement between said shafts is maintained when said shafts are initially within $$\frac{360}{n+1}$$

degrees of positional agreement; a motor for driving said output shaft, a relay for connecting said synchro-generator and said synchro-motor or said motor to a source of electrical power; a pair of commutators each having a plurality of segments and a contact arm, one commutator being operatively connected to said output shaft and the other commutator being operatively connected to said input shaft, each segment of one commutator being connected to a corresponding segment of the other commutator; and connections for applying operating current to said relay in series with said commutators whereby said motor is connected to said source of power only when there is a positional deviation between said input and output shafts which exceeds a predetermined value.

6. A device of the character described in claim 5 in which the number of segments on each commutator is equal to $n+1$.

RANDALL C. BALLARD.

REFERENCES CITED

The following references are of record in the file of this patent:

UNITED STATES PATENTS

| Number | Name | Date |
| --- | --- | --- |
| 1,539,187 | Hewlett et al. | May 26, 1925 |
| 1,658,660 | Traver | Feb. 7, 1928 |
| 1,832,809 | Hudson | Nov. 17, 1931 |
| 2,085,442 | Newell | June 29, 1937 |